US005701207A

United States Patent [19]
Waketa et al.

[11] Patent Number: 5,701,207
[45] Date of Patent: Dec. 23, 1997

[54] CAMERA WITH A FIXED FOCAL LENGTH LENS

[75] Inventors: Yuko Waketa; Nobuyoshi Mori, both of Hachioji, Japan

[73] Assignee: Konica Corporation, Japan

[21] Appl. No.: 577,411

[22] Filed: Dec. 22, 1995

[30] Foreign Application Priority Data

Dec. 28, 1994 [JP] Japan .................. 6-337573
Mar. 16, 1995 [JP] Japan .................. 7-083440

[51] Int. Cl.⁶ .................................. G02B 13/18
[52] U.S. Cl. .................. 359/717; 359/716; 359/718
[58] Field of Search .................. 359/717, 718, 359/719, 716

[56] References Cited

U.S. PATENT DOCUMENTS 4,443,067 4/1984 Oweng, Jr. et al. .................. 359/717
5,166,830 11/1992 Ishibai et al. .................. 359/717

Primary Examiner—Scott J. Sugarman
Attorney, Agent, or Firm—Jordan B. Bierman; Bierman, Muserlian and Lucas LLP

[57] ABSTRACT

A camera for taking a photograph on a picture plane of a rolled film which has a width of 24 mm. The camera includes: a photographing lens of which a convex surface is faced toward an object to be photographed and satisfying: $18 \leq f \leq 32$ and $f^2/90 \leq F \leq 16$ in which f is the focal length of the photographing lens and F is the F-number of the photographing lens; at least one diaphragm; and the picture plane having a picture frame satisfying: $23 \leq L \leq 32$ and $1.5 \leq L/S\ 6.5$ in which L (mm) is the long dimension of the picture frame, S is the short dimension of the picture frame, and an image of the object is focused on the picture plane through the photographing lens and the diaphragm.

17 Claims, 12 Drawing Sheets

CAMERA WITH A FIXED FOCAL LENGTH LENS

BACKGROUND OF THE INVENTION

The present invention relates to a small fixed focus camera or a one-way-use camera unit.

One-way-use camera units using 35 mm roll film, developed in the mid-1980s, made picture taking operations easy so that picture taking could be carried out at any desired time, and made picture taking more popular. One-way-use cameras were originally compact and light, however, more compact and thinner cameras were further demanded. In response, more compact and thinner cameras are now being developed. Further, as photography becomes familiar, camera users require higher quality and more variations of the one-way-use camera unit. Accordingly, high aspect-ratio type cameras, or the like, are being developed in the 1990s, and an interest in a wide angle lens, by which both an object and its broad background canbe photographed simultaneoussly, is increasing, resulting in requirements for a camera with a photographic lens having a wider angle range than a 35 mm lens. As the one-way-use camera unit is provided with higher functions, the differences between the one-way-use camera and other compact cameras decrease, and therefore, a simpler camera, which fills the gap between the two cameras, is required.

Recently, a camera system provided with very convenient portability is being developed, without depending on the conventional film standard. For example, other than the conventional 35 film, a new system, with a film width of 24 mm, and which has 3 types of image surface formats, is disclosed on page 8 in the October issue, and on page 10 in the November issue, 1994, of the Journal of Popular Photography, USA, and on page 11 in the December issue, 1994, in the Journal of Photographic Industry, Japan.

The object of the present invention is to provide an optical structure of a camera, the depth of which is 26 mm or less, and which is very conveniently portable, without depending on the 2:3 ratio of longitudinal length to lateral width of the frame of conventional 35 mm roll film, and to provide a camera system by which sufficient image quality can be obtained over the entire image surface, in the one-way-use camera unit, or a simply structured fixed-focus camera.

In this connection, in this specification, when a word of "camera" is used, the word means a small fixed focus camera and a one-way-use camera.

SUMMARY OF THE INVENTION

In order to solve the above-described problems, a camera of the present invention is structured as follows. The camera has a picture plane which satisfies the following relationship: $23 \leq L \leq 32$; and the aspect ratio of the long side length to the short side length, L/S, of a picture frame is $1.5 \leq L/S \leq 6.5$, when a 24 mm roll film width W is used, and the long dimension of the picture frame is defined as L (mm), and the short dimension of the picture frame is defined as S (mm). The camera comprises: a lens system composed of a single positive lens which is a positive meniscus lens, formed so as to have the convex curve facing the object, or a lens system composed of two positive lenses including a positive meniscus lens, with the convex curve facing the object, and a positive lens located on the image side of the meniscus lens; at least one diaphragm locatea on the image side of the positive meniscus lens; and the picture plane curved toward the lenses on both sides of the picture frame in the longitudinal direction of the picture frame onto which the image is formed by the lens system. Further, the lens system of the present invention is structured so that it satisfies the following relationship when the focal length is defined as f (mm), and the F-number is defined as F, $$18 \leq f \leq 32 \tag{1}$$

$$f^2/90 \leq F \leq 16 \tag{2}$$

More specifically, in the case where the lens system is composed of a single positive meniscus lens, when a parameter $\beta$ is defind as follows $$\beta = \left(1 - \frac{1}{n}\right) \cdot \frac{f}{r_1},$$

where f is the focal length, n is the refractive index and $r_1$ is the radius of curvature of the lens surface on its object side, the shape of the lens is formed so that the $\beta$ satisfies the following relationship, $$1.5 \leq \beta \leq 1.8 \tag{3}$$

Further, the shape of curvature of the picture plane is formed so that it satisfies the following relationship, when the displacement amount from a plane, perpendicular to the optical axis, the plane crossing the intersection of the picture plane with the lens axis, and being positioned at a distance h from the optical axis in the longitudinal direction on the image plane, is defined as $\Delta$ (h), $$\tfrac{1}{2}(0.8\, h_{max})^2(P-F/550) \leq \Delta(0.8\, h_{max}) \leq 1.5 \tag{4}$$

where P is the Petzval's sum of the lens, F is the F-number, and $h_{max}$ is the maximum distance in the longitudinal direction on the picture plane from the optical axis.

As a specific example, satisfying the above relationship (4), the curved film surface is formed as a portion of a cylindrical surface having a radius of curvature R (mm), and satisfies the following relationship, $$48 \leq R \leq (P-F/550)^{-1} \tag{5-1}$$

Further, in the case where the lens system is composed of 2 positive lenses, it satisfies the following relationship, $$48 \leq R \leq (P-F/450)^{-1} \tag{5-2}$$

In the case where the lens system is composed of single meniscus lens, the diaphragm is arranged so that it satisfies the following relationship, when the distance from the first surface of the lens to an aperture-stop located closest to the image side is defined as X (mm), $$0.12 \leq X/f \leq 0.18 \tag{6-1}$$

Further, in the lens system, a diaphragm, which limits the luminous flux outside the axis, is provided between the aperture-stop and the lens.

In the case where the lens system is composed of not less than 2 lenses, the above-relationship becomes $$0.1 \leq X/f \leq 0.23 \tag{6-2}$$

Further, in a lens system, where the focal length of the positive meniscus lens, being convex to the object side, is defined as $f_1$, and the focal length of the positive lens located at its image side is defined as $f_2$, the following relationship is satisfied, $$0.25 \leq f_1/f_2 \leq 1.5 \tag{7}$$

Still further, when the radius of curvature of the object side surface of the positive lens, located on the image side, is defined as $r_3$, and the radius of curvature of the image side surface of this positive lens is defined as $r_4$, the following relationship is satisfied.

$$-8 \leq (r_4+r_3)/(r_4-r_3) \leq 0 \tag{8}$$

Further, when the refractive index of the lens of which the lens system is composed, is defined as n, and the Abbe's number is defined as vd, it is preferable that the following relationship is satisfied.

$$1.45 \leq n \leq 1.65 \tag{9}$$

$$50 \leq vd \tag{10}$$

In the case of a fixed focus camera using roll film of width W (mm), when the focal length of the photographing lens is defined as f, and the F-number is defined as F, it is preferable that the following relationships are satisfied.

$$10 \leq W \leq 26 \tag{11}$$

$$0.75 \leq f/W \leq 1.4 \tag{12}$$

$$f^2/4W \leq F \leq 16 \tag{13}$$

The film used in the present invention has a width W of 24 mm, as shown in FIG. 23, and the image surface on which an image is formed, has a length of L (mm), and a width of S (mm). The image sensing surface is curved in the direction of the film length, as shown in FIG. 24.

When the lens closest to the object side, is formed as a meniscus, being convex toward the object side, and its refractive power is arranged as a telescopic type lens, the thickness of the camera can be reduced. Further, when a diaphragm is arranged behind the lens, the astigmatism aberration of the lens can be reduced, and the image surface can be formed like a Petzval surface. This Petzval surface is formed such that the closer a portion of the image surface is to the peripheral portions of the image surface, the more the surface is curved toward the lens side. When the film surface is formed such that the closer a portion of the film surface is toward its ends in the longitudinal direction, the more the film surface is curved toward the lens side, the deterioration of the image due to the curvature of the field is prevented.

When the upper limit of the relationship (1) is exceeded, the overall length of the lens is increased, and a thin camera can be barely realized. When the focal length is less than the lower limit of the relationship (1), even if the image sensing surface is curved as described above, the difference of the image quality between the short side direction and the long side direction becomes large. Further, the aberration outside the axis such as coma, astigmatism, transverse chromatic aberration and distortion aberration, becomes too large, and the image quality in the peripheral portions of the image surface is greatly lowered.

Accordingly, it is preferable to satisfy the following relationship, $$20 \leq f \leq 28 \tag{1'}$$

and more preferably, $$22 \leq f \leq 26 \tag{1''}$$

The relationship (2) is a condition to obtain a fixed focus camera system by which a desired image quality can be obtained. When the F-number is above the upper limit of the relationship (2), the quantity of light tends to be insufficient in case of cloudy weather, or indoor, resulting in incorrect exposure image, and a practical camera system can not be obtained.

Further, this relationship is also a condition to obtain an appropriate depth of field. Generally, when the F-number of a lens is denoted by F, the focal length is f (mm), and the circle of confusion is denoted by $\epsilon$ (mm), the hyper-focal distance $U_0$ is expressed by the following relationship. When an object located at distance $U_0$ is focused, an almost focused image is obtained from the nearest distance $U_0/2$ to infinity.

$$U_0 = f^2/F\epsilon$$

From investigation of a great number of actual photographs, the value of the circle of confusion $\epsilon$ is almost 0.05 mm when the magnification ratio of the image from the exposed negative film is approximately 5. When the nearest distance $U_0/2$ is shorter than 0.9 m, the following relationship is obtained, $$f^2/(2 \times 0.05F) \leq 900$$

From this relationship, the condition of the lower limit of the relationship (2) is obtained. When the value is lower than this condition, the focused area is smaller. Further, the decrease of the image quality due to the spherical aberration is remarkable.

It is preferable to satisfy the following relationship, practically, $$f^2/70 \leq F \leq 16 \tag{2'}$$

more preferably, $$f^2/64 \leq F \leq 12 \tag{2''}$$

When a value of $\beta$ is larger than the upper limit of the relationship (3), the spherical aberration, axial chromatic aberration and transverse chromatic aberration become larger. When a value of $\beta$ is lower than the lower limit of the relationship (3), the Petzval's sum becomes larger, and the overall length of the lens becomes longer.

It is more preferable to satisfy the following relationship, $$1.5 \leq \beta \leq 1.7 \tag{2''}$$

The relationship (4) regulates the amount of curvature of the image sensing surface. When the upper limit is exceeded, the difference between the image quality in the direction of the long side of the image surface and that in the direction of the short side becomes larger. Further, the barrel form distortion generated to the object, which is photographed in the vicinity of the limits of the image sensing surface, in the direction of the long side of the image sensing surface, becomes conspicuous, and it is not preferable. Reversely, if the required value, Δ (0.8 $h_{max}$), is lower than the lower limit, the amount of curvature of the image sensing surface is short, and the image quality is deteriorated on the peripheral portions in the direction of the long side of the image surface.

It is more preferable to satisfy the following relationship, $$½(0.8\ h_{max})^2(P-F/600) \leq \Delta(0.8\ h_{max}) \leq 1.3 \qquad (4')$$

When the upper limits of the relationship (5-1) and (5-2) are exceeded, the amount of curvature of the image sensing surface is shorter than the curvature of the field, and the image quality of the peripheral portions is deteriorated in the direction of the long side of the image surface. When the lower limits of the relationship are exceeded towards the lower side, the reference between the image quality in the long side of the image surface and that of the short side becomes too large, and, further, the film can not be smoothly fed.

Accordingly, it is more preferable in the relationship (5-1) that the following relationship is satisfied, $$65 \leq R \leq (P-F/600)^{-1} \qquad (5-1')$$

Further, it is preferable in the relationship (5-2) that the above relationship is also satisfied.

The relationships (6-1) and (6-2) are conditions relating to the coma and transverse chromatic aberration. When the upper limit of each relationship is exceeded, the transverse chromatic aberration becomes larger, and when the lower limit of each relationship is exceeded towards the lower side, the negative coma becomes larger. Further, when a diaphragm to limit the luminous flux outside the axis is provided between the aperture-stop and the lens, the coma can be reduced.

Accordingly, it is more preferable in the relationship (6-1) that the following relationship is satisfied, $$0.13 \leq X/f \leq 0.16 \qquad (6-1')$$

Further, it is preferable in the relationship (6-2) that the following relationship is satisfied, $$0.13 \leq X/f \leq 0.21 \qquad (6-2')$$

When the lower limit of the relationship (7) is exceeded towards the lower side, the positive distortion aberration and transverse chromatic aberration become larger, which is undesirable. When the upper limit of the relationship (7) is exceeded, the positive distortion aberration becomes too small, and when the image sensing surface is curved, the barrel form distortion generated in the direction of the long side of the image surface becomes larger, which is undesirable.

It is more preferable that the following relationship is satisfied, $$0.4 \leq f_1/f_2 \leq 0.8 \qquad (7')$$

When the lower limit of the relationship (8) is exceeded towards the lower side, the astigmatism becomes larger. When the upper limit of the relationship (8) is exceeded, the meridional image surface is concave and its curvature becomes too large. These conditions are not preferable.

It is more preferable that the following relationship is satisfied, $$-6 \leq (r_4+r_3/r_4-r_3) \leq -1 \qquad (8')$$

When the upper limit of the relationship (9) is exceeded, the cost of the glass material is higher, and the glass lens is harder and rather difficult to polish, and the cost of lens is therefore increased, in the case where the glass lens material is used. When the lower limit of the relationship (9) is exceeded towards the lower side, the spherical aberration becomes larger. Further, when the lower limit of the relationship (10) is exceeded towards the lower side, the chromatic aberration, specifically, the transverse chromatic aberration becomes larger, and an image on the peripheral portions of the image surface is colored, which is not preferable.

In the case where the focused results are evaluated on equal size prints without depending the film width W, the allowable circle of confusion δ on the film can be expressed by the following relationship, when a is a constant, $$\delta = a\ W$$

Further, in the case where the ratio of the image surface of the film is constant without depending on the film width, and the angle of view of the photographic lens is not dependent on the film width W, the focal length f of the photographic lens is expressed by the following relationship, when b is a constant, $$f = b\ W$$

Further, when the F-number F of the photographic lens is constant without depending on the film width W, the hyperfocal distance $U_0$ is expressed by the following relationship, $$U_0 = f^2/F\delta = b^2w^2/FaW = (b^2/Fa)\ W,\ \text{and then,}$$

$$U_0 = (\text{a constant}) \times W$$

That is, the narrower the film width is, the smaller the $U_0$ is, resulting in a broader depth of field. In other words, in order to obtain a fixed focus camera having the same depth of field, the narrower the film width W is, the smaller the F-number is.

In a camera, the depth of which is within 26 mm, to be provided by the present invention, when the upper limit of the relationship (11) is exceeded, the depth of field is decreased, or the F-number is increased, resulting in the decrease of the overall image quality (focus, exposure) of the camera. Reversely, when the lower limit of the relationship (11) is exceeded towards the lower side, the graininess of a film is adversely affected at the time of printing, also resulting in the decrease of the image quality.

Accordingly, it is preferable that the relationship (11) satisfies the following relationship, $$23 \leq W \leq 25 \qquad (11')$$

When the upper limit of the relationship (12) is exceeded, the focal length becomes longer, and accordingly, the overall length of the lens becomes longer, and a compact camera, in which advantages of the narrower width film are fully utilized, can not be obtained. Reversely, when the lower limit of the relationship (12) is exceeded towards the lower side, the angle of view of the photographic lens becomes too large, and the wide use of it as a common use camera is reduced, and accordingly, it becomes difficult for the general users to use the camera.

Therefore, it is preferable that the relationship (12) satisfies the following relationship, $$0.8 \leq f/W \leq 1.2 \quad (12')$$

When the upper limit of the relationship (13) is exceeded, the F-number becomes too large, and photographs tend to be under-exposed, which is not desirable. When the lower limit of the relationship (13) is exceeded towards the lower side, the depth of field is smaller, and undesirably focused photographs are increased, which is also not desirable.

Accordingly, it is preferable that the relationship (13) satisfies the following relationship, $$f^2/2W \leq F \leq 12 \quad (13')$$

DETAILED DESCRIPTION OF THE INVENTION

Figure 1:
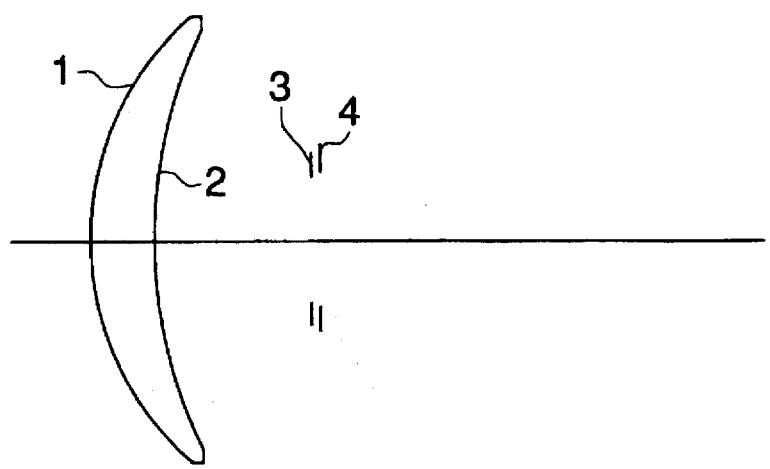
FIG. 1 is a sectional view of the first example of an optical system for use in a camera of the present invention.
Figure 2:
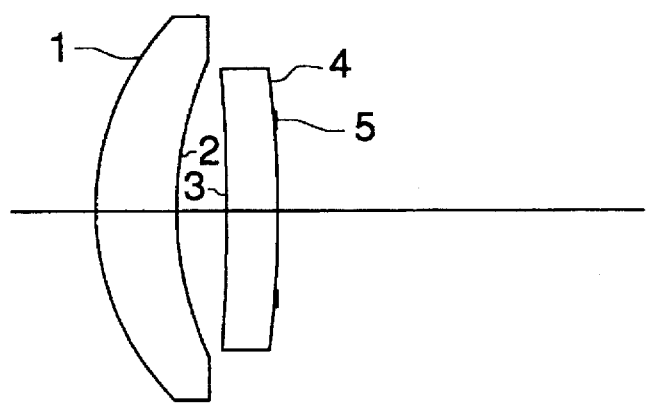
FIG. 2 is a sectional view of the 13th example of the optical system for use in a camera of the present invention.
Figure 3:
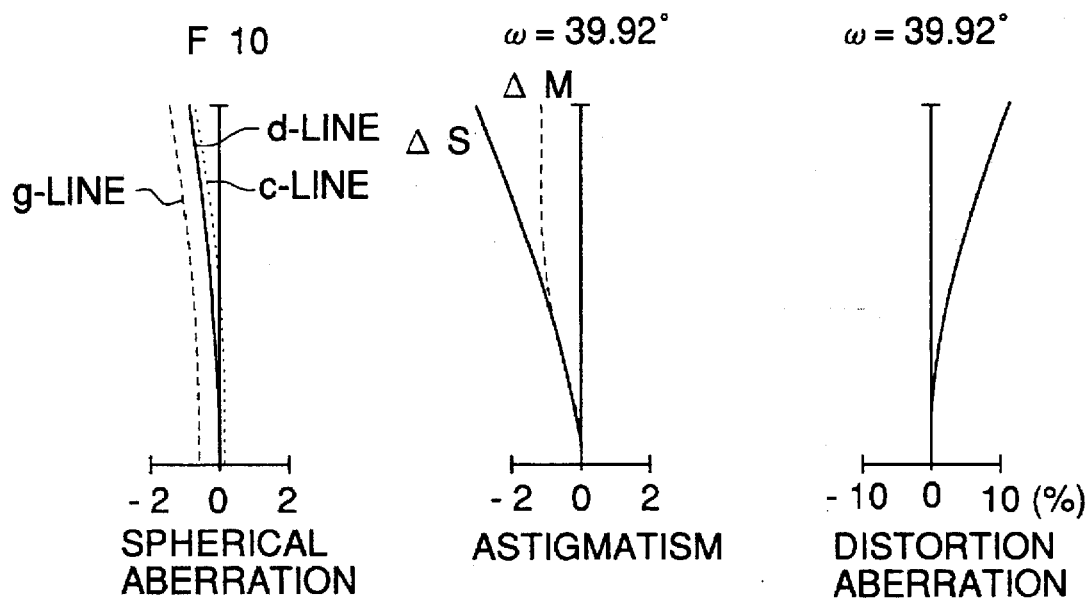
FIG. 3 is a view of aberration of the first example of the optical system for use in the camera of the present invention.
Figure 4:
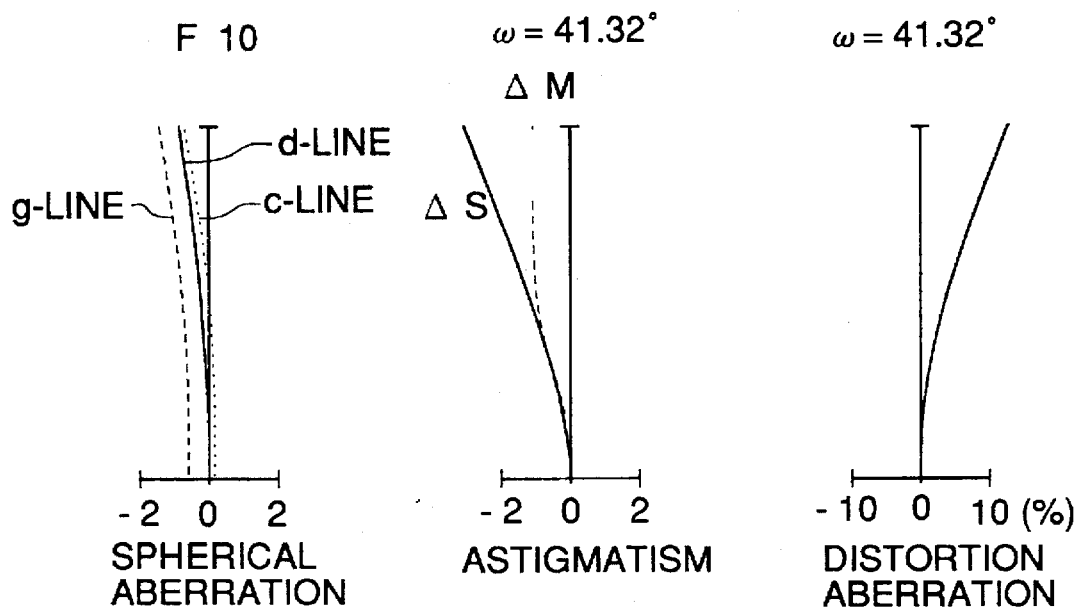
FIG. 4 is a view of aberration of the 2nd example of the optical system for use in the camera of the present invention.
Figure 5:
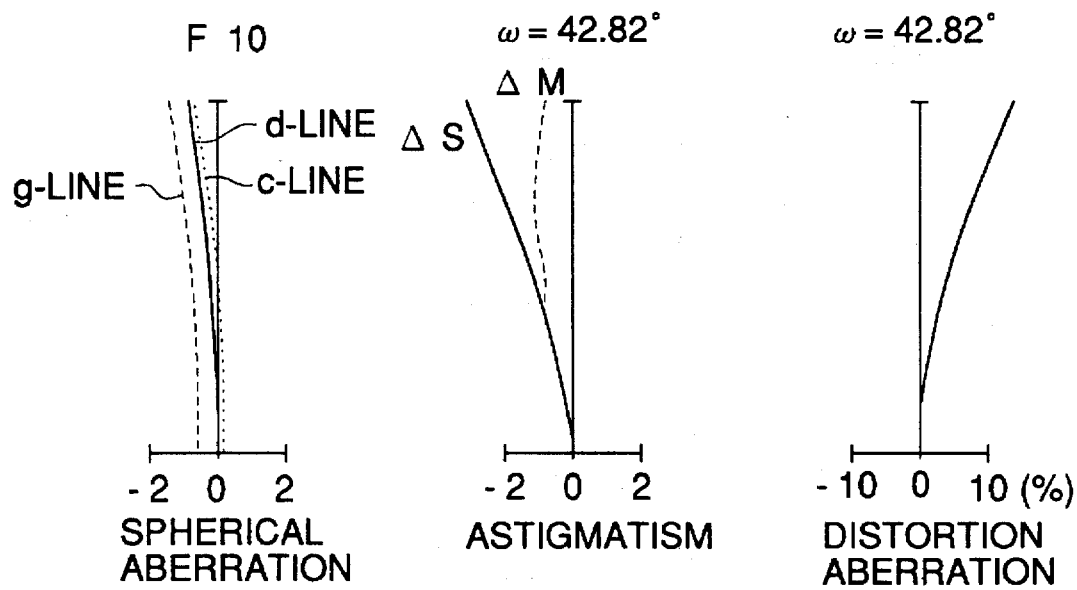
FIG. 5 is a view of aberration of the 3rd example of the optical system for use in the camera of the present invention.
Figure 6:
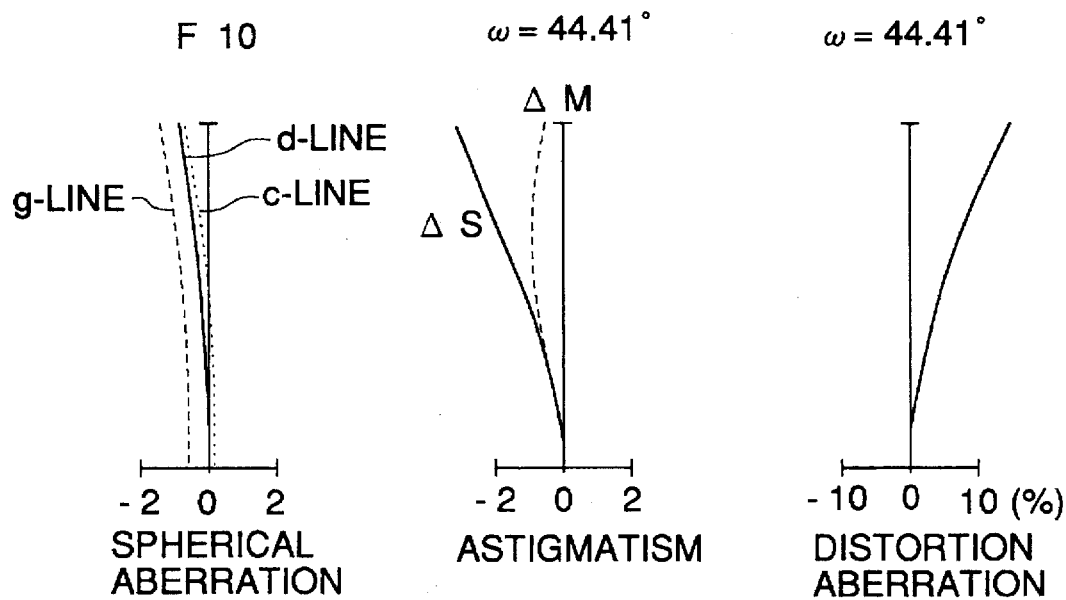
FIG. 6 is a view of aberration of the 4th example of the optical system for use in the camera of the present invention.
Figure 7:
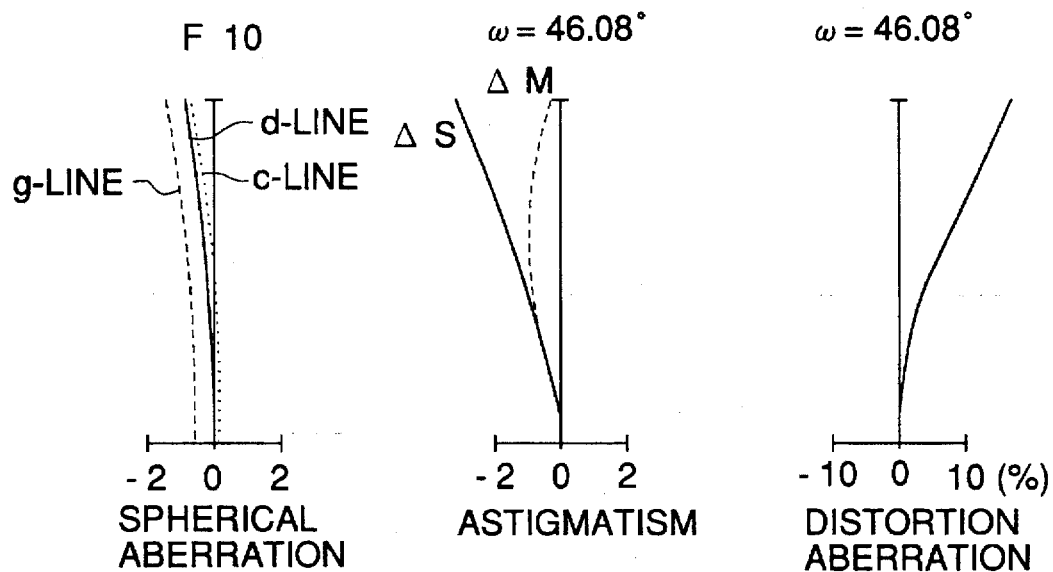
FIG. 7 is a view of aberration of the 5th example of the optical system for use in the camera of the present invention.
Figure 8:
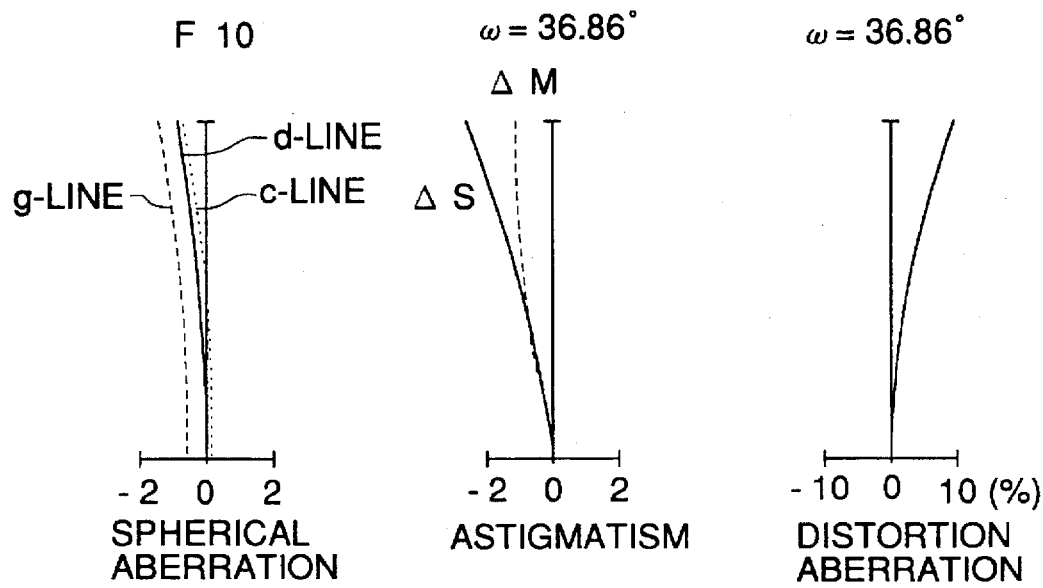
FIG. 8 is a view of aberration of the 6th example of the optical system for use in the camera of the present invention.
Figure 9:
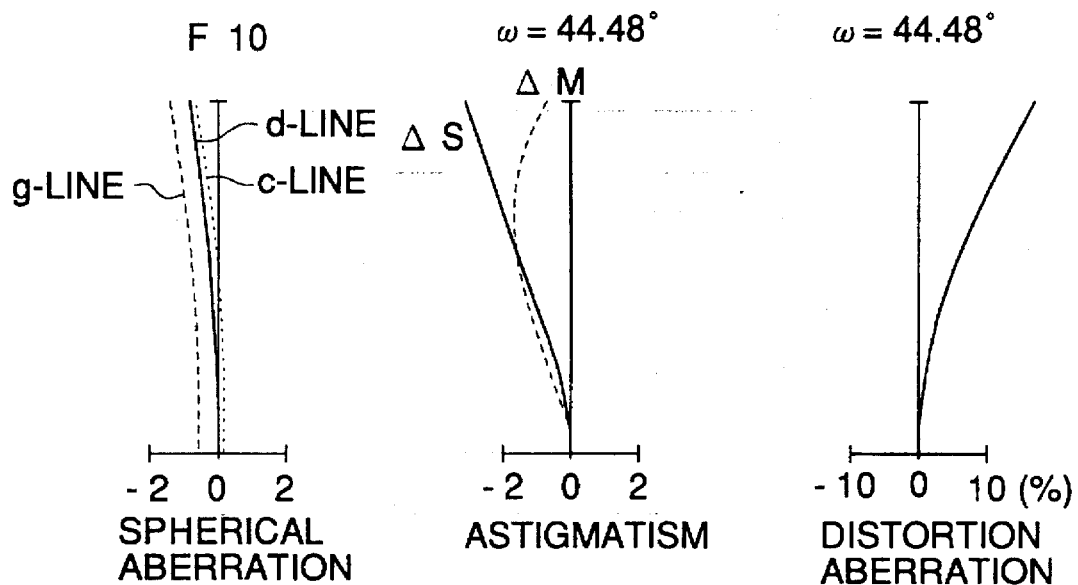
FIG. 9 is a view of aberration of the 7th example of the optical system for use in the camera of the present invention.
Figure 10:
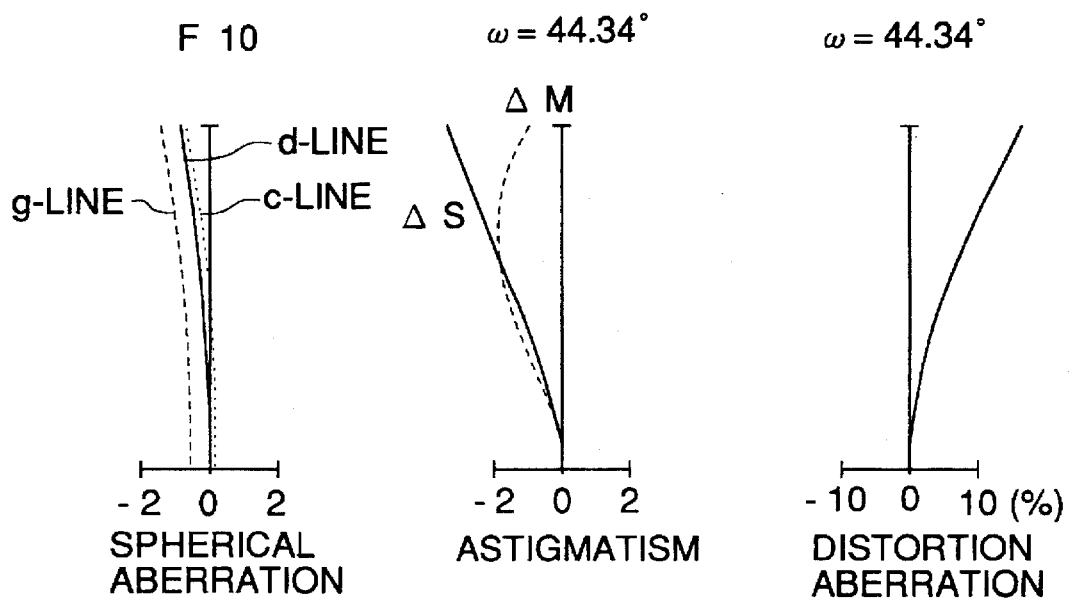
FIG. 10 is a view of aberration of the 8th example of the optical system for use in the camera of the present invention.
Figure 11:
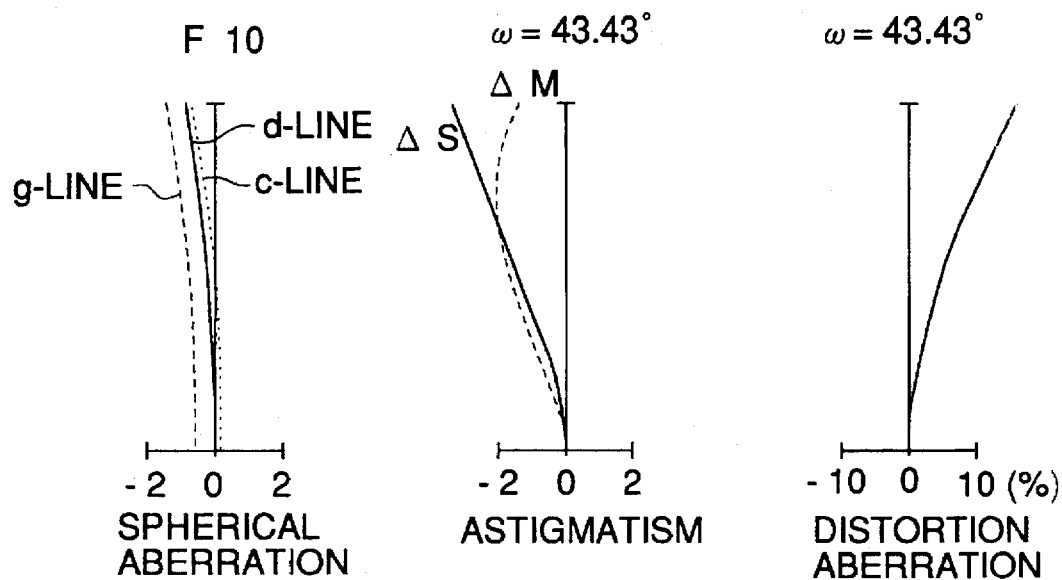
FIG. 11 is a view of aberration of the 9th example of the optical system for use in the camera of the present invention.
Figure 12:
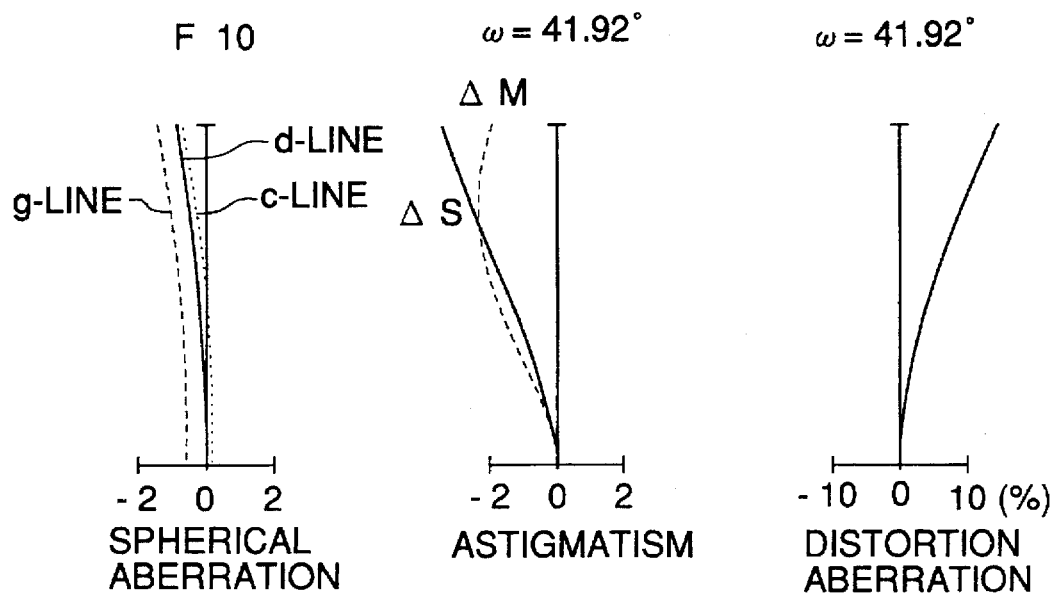
FIG. 12 is a view of aberration of the 10th example of the optical system for use in the camera of the present invention.
Figure 13:
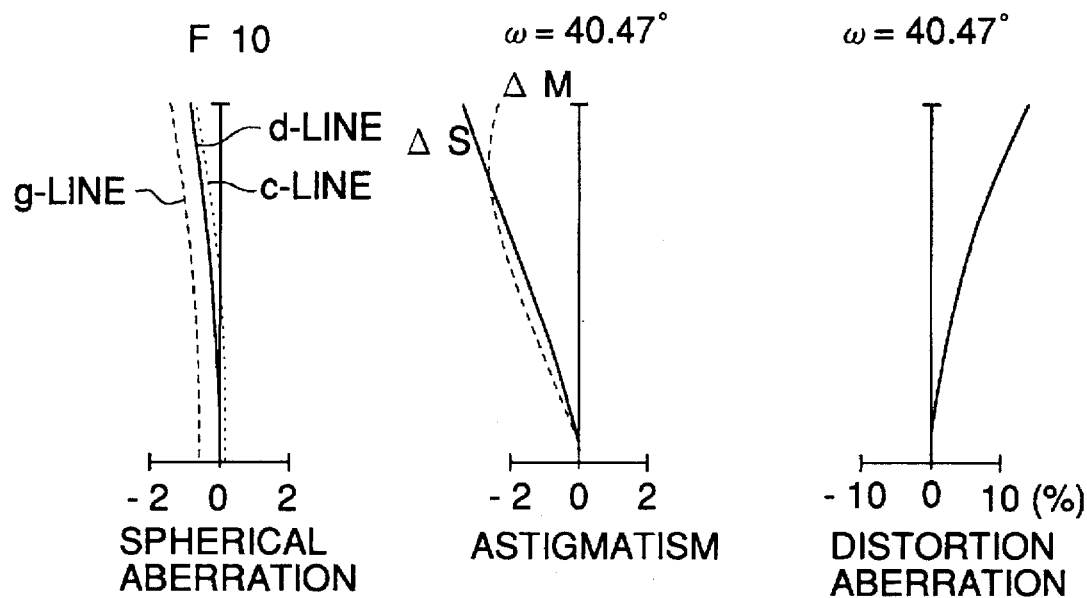
FIG. 13 is a view of aberration of the 11th example of the optical system for use in the camera of the present invention.
Figure 14:
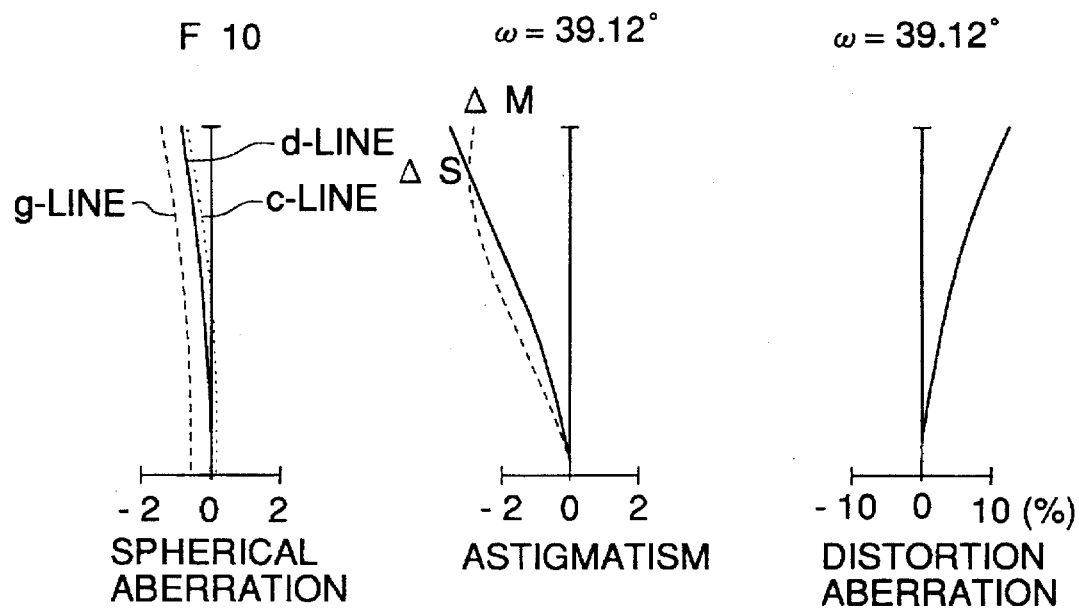
FIG. 14 is a view of aberration of the 12th example of the optical system for use in the camera of the present invention.
Figure 15:
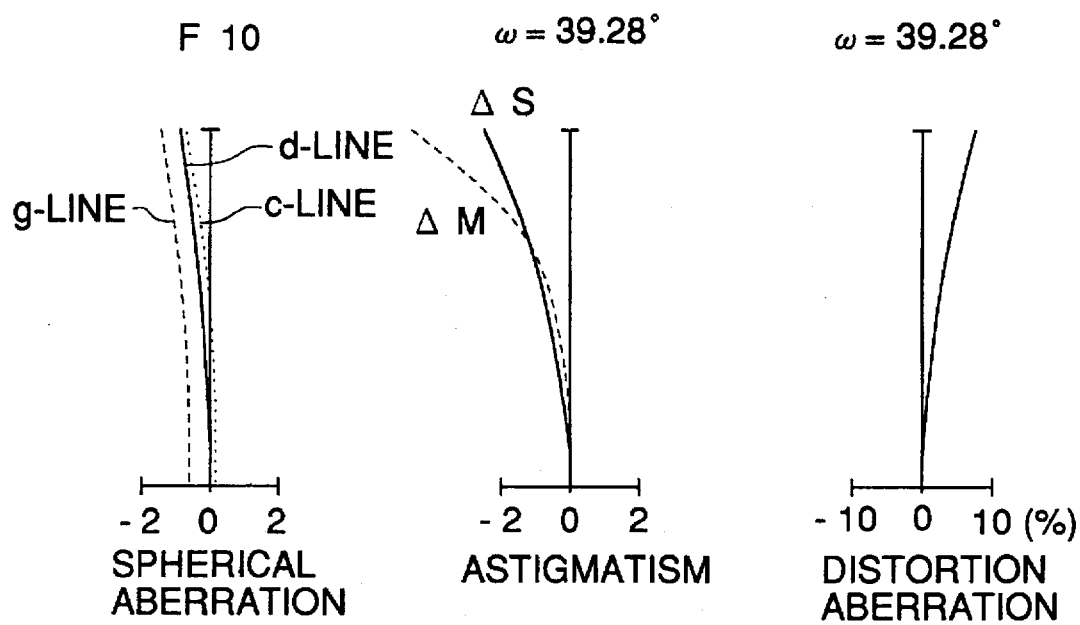
FIG. 15 is a view of aberration of the 13th example of the optical system for use the camera of in the present invention.
Figure 16:
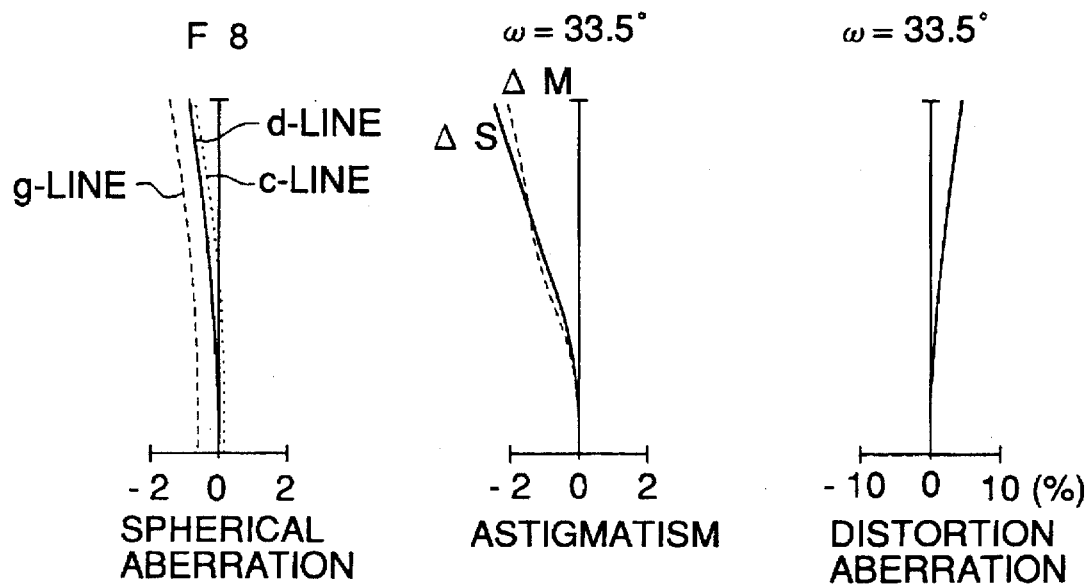
FIG. 16 is a view of aberration of the 14th example of the optical system for use in the camera of the present invention.
Figure 17:
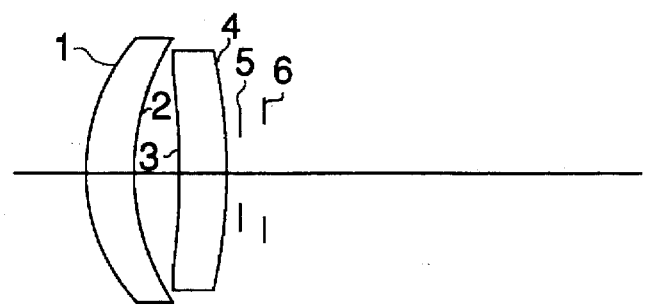
FIG. 17 is a sectional view of the 15th example of the optical system for use in the camera of the present invention.
Figure 18:
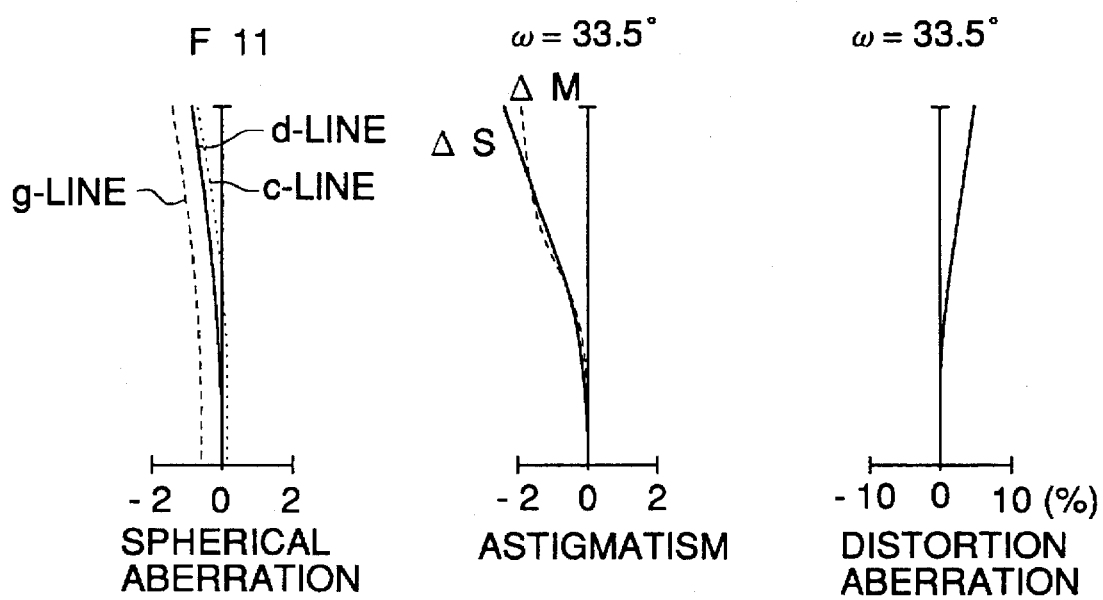
FIG. 18 is a view of aberration of the 15th example of the optical system for use in the camera of the present invention.
Figure 19:
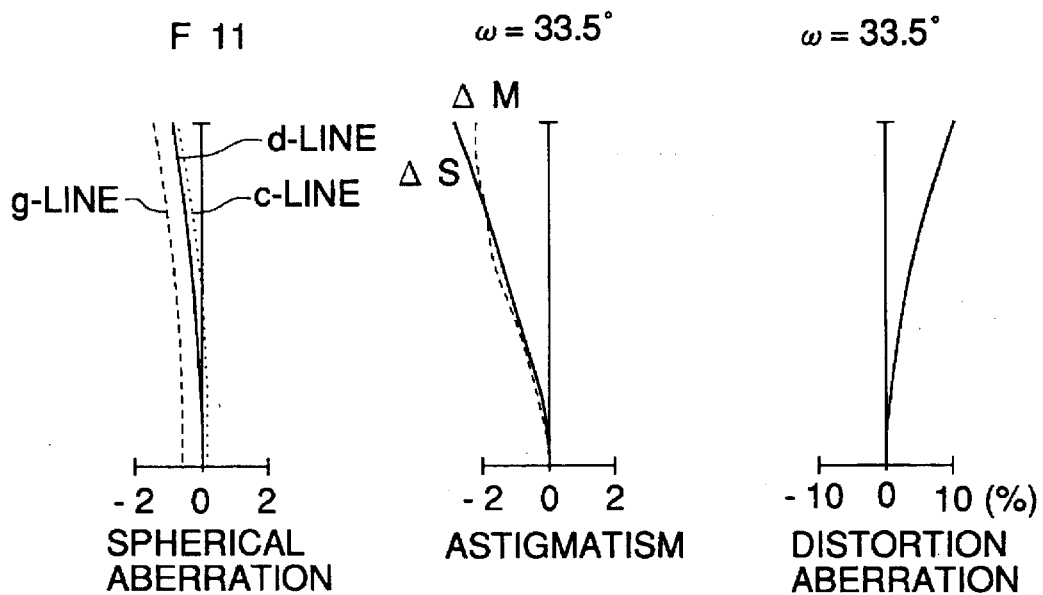
FIG. 19 is a view of aberration of the 16th example of the optical system for use in the camera of the present invention.
Figure 20:
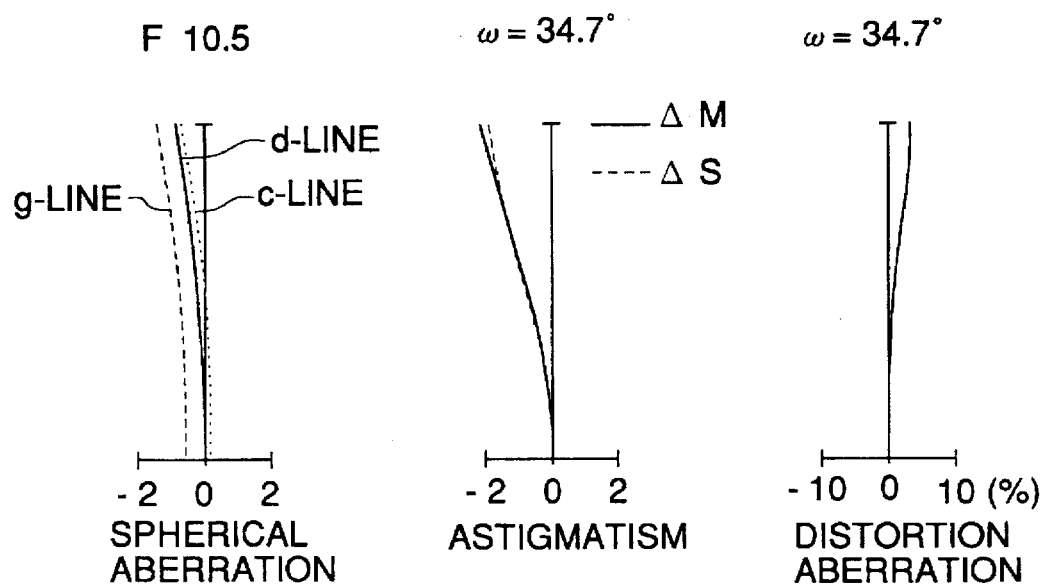
FIG. 20 is a view of aberration of the 17th example of the optical system for use in the camera of the present invention.

Examples of an optical system for use in a camera of the present invention will be described below. The following symbols are used in tables described below.

r: The radius of curvature (mm) of the surface of refraction

D: The interval (mm) of the surface of refraction nd: The index of refraction of D-line of a lens material Vd: Abbe's number of a lens material f: The focal length (mm) of the overall system F: F-number β: The parameter which is defined as follows:

$$\beta = \left(1 - \frac{1}{n}\right) \cdot \frac{f}{r_1}$$

P: The Petzval's sum x: The distance (mm) from the first surface of the lens to an aperture-stop located nearest to the image side ω: The half angle of view (°)

TL: Overall length of the lens (the distance from the first surface of the lens to the image forming surface) (mm)

The shape of the aspherical surface of the present invention is expressed by the following equation, when the direction of the optical axis is expressed by the X-axis, and the direction perpendicular to the optical axis is expressed by the Y-axis, $$x = \frac{y^2/r}{1 + \sqrt{1 - (1+K)y^2/r^2}} + \sum_{i=2}^{\infty} A_{2i} y^{2i} \quad \text{[Equation 1]}$$

where, r represents the paraxial radius of curvature, and K and $A_{2i}$ are coefficients of the aspherical surface. Further, in examples described below, the image forming surface is formed as a cylindrical surface which has the radius of curvature R of 90, and is curved toward the lens side in the direction of long side of the image surface. In FIGS. 1, 2, 17 and 21, the numeral represents the surface number in each example.

1st Example

| Surface No. | r | D | nd | vd |
| --- | --- | --- | --- | --- |
| 1 | 4.800 | 1.01 | 1.492 | 57 |
| 2 | 7.423 | 2.5 | | |
| 3 | diaphragm | 0.1 | | |
| 4 | diaphragm (aperture-stop) | | | |

-continued

| | | | |
|---|---|---|---|
| f = 24.50 | F = 10.0 | β = 1.68 | P = 0.0243 |
| x/f = 0.147 | ω = 39.92 | TL = 24.12 | |

2nd Example

| Surface No. | r | D | nd | vd |
|---|---|---|---|---|
| 1 | 4.600 | 0.97 | 1.492 | 57 |
| 2 | 7.108 | 2.3 | | |
| 3 | diaphragm | 0.1 | | |
| 4 | diaphragm (aperture-stop) | | | |

| | | | |
|---|---|---|---|
| f = 23.50 | F = 10.0 | β = 1.68 | P = 0.0253 |
| x/f = 0.147 | ω = 41.32 | TL = 23.12 | |

3rd Example

| Surface No. | r | D | nd | vd |
|---|---|---|---|---|
| 1 | 4.400 | 0.93 | 1.492 | 57 |
| 2 | 6.794 | 2.2 | | |
| 3 | diaphragm | 0.1 | | |
| 4 | diaphragm (aperture-stop) | | | |

| | | | |
|---|---|---|---|
| f = 22.50 | F = 10.0 | β = 1.69 | p = 0.0264 |
| x/f = 0.148 | ω = 42.82 | TL = 22.12 | |

4th Example

| Surface No. | r | D | nd | vd |
|---|---|---|---|---|
| 1 | 4.200 | 0.92 | 1.492 | 57 |
| 2 | 6.463 | 2.1 | | |
| 3 | diaphragm | 0.1 | | |
| 4 | diaphragm (aperture-stop) | | | |

| | | | |
|---|---|---|---|
| f = 21.50 | F = 10.0 | β = 1.69 | P = 0.0275 |
| x/f = 0.149 | ω = 44.41 | TL = 21.10 | |

5th Example

| Surface No. | r | D | nd | vd |
|---|---|---|---|---|
| 1 | 4.000 | 0.88 | 1.492 | 57 |
| 2 | 6.148 | 2.0 | | |
| 3 | diaphragm | 0.1 | | |
| 4 | diaphragm (aperture-stop) | | | |

| | | | |
|---|---|---|---|
| f = 20.50 | F = 10.0 | β = 1.69 | P = 0.0288 |
| x/f = 0.149 | ω = 46.08 | TL = 20 11 | |

6th Example

| Surface No. | r | D | nd | vd |
|---|---|---|---|---|
| 1 | 5.000 | 1.1 | 1.492 | 57 |
| 2 | 7.710 | 2.6 | | |
| 3 | diaphragm | 0.1 | | |
| 4 | diaphragm (aperture-stop) | | | |

| | | | |
|---|---|---|---|
| f = 25.50 | F = 10.0 | β = 1.68 | P = 0.0232 |
| x/f = 0.149 | ω = 36.86 | TL = 25.08 | |

7th Example

| Surface No. | r | D | nd | vd |
|---|---|---|---|---|
| 1 | 4.000 | 1.1 | 1.492 | 57 |
| 2 | 6.028 | 1.5 | | |
| 3 | diaphragm | 0.1 | | |
| 4 | diaphragm (aperture-stop) | | | | aspherical coefficients 1st surface
$K = 0$    $A_4 = 0.15 \times 10^{-3}$    ($A_{2i} = 0$, when $i \geq 3$)
$f = 20.50$    $F = 10.0$    $\beta = 1.69$    $P = 0.0277$
$x/f = 0.132$    $\omega = 44.48$    $TL = 19.96$

8th Example

| Surface No. | r | D | nd | vd |
|---|---|---|---|---|
| 1 | 4.200 | 1.16 | 1.492 | 57 |
| 2 | 6.331 | 1.56 | | |
| 3 | diaphragm | 0.1 | | |
| 4 | diaphragm (aperture-stop) | | | | aspherical coefficients 1st surface
$K = 0$    $A_4 = 0.15 \times 10^{-3}$    ($A_{2i} = 0$, when $i \geq 3$)
$f = 21.50$    $F = 10.0$    $\beta = 1.69$    $P = 0.0264$
$x/f = 0.131$    $\omega = 44.34$    $TL = 20.94$

9th Example

| Surface No. | r | D | nd | vd |
|---|---|---|---|---|
| 1 | 4.400 | 1.21 | 1.492 | 57 |
| 2 | 6.640 | 1.65 | | |
| 3 | diaphragm | 0.1 | | |
| 4 | diaphragm (aperture-stop) | | | | aspherical coefficients 1st surface
$K = 0$    $A_4 = 0.15 \times 10^{-3}$    ($A_{2i} = 0$, when $i \geq 3$)
$f = 22.50$    $F = 10.0$    $\beta = 1.69$    $P = 0.0253$
$x/f = 0.132$    $\omega = 43.43$    $TL = 21.93$

10th Example

| Surface No. | r | D | nd | vd |
|---|---|---|---|---|
| 1 | 4.600 | 1.27 | 1.492 | 57 |
| 2 | 6.944 | 1.73 | | |
| 3 | diaphragm | 0.1 | | |
| 4 | diaphragm (aperture-stop) | | | | aspherical coefficients 1st surface
$K = 0$    $A_4 = 0.15 \times 10^{-3}$    ($A_{2i} = 0$, when $i \geq 3$)
$f = 23.50$    $F = 10.0$    $\beta = 1.68$    $P = 0.0242$
$x/f = 0.132$    $\omega = 41.92$    $TL = 22.91$

11th Example

| Surface No. | r | D | nd | vd |
|---|---|---|---|---|
| 1 | 4.800 | 1.32 | 1.492 | 57 |
| 2 | 7.253 | 1.80 | | |
| 3 | diaphragm | 0.1 | | |
| 4 | diaphragm (aperture-stop) | | | | aspherical coefficients 1st surface
$K = 0$   $A_4 = 0.15 \times 10^{-3}$   ($A_{2i} = 0$, when $i \geq 3$)
$f = 24.50$   $F = 10.0$   $\beta = 1.68$   $p = 0.0232$
$x/f = 0.131$   $\omega = 40.47$   $TL = 23.91$

12th Example

| Surface No. | r | D | nd | vd |
|---|---|---|---|---|
| 1 | 5.000 | 1.38 | 1.492 | 57 |
| 2 | 7.556 | 1.88 | | |
| 3 | diaphragm | 0.1 | | |
| 4 | diaphragm (aperture-stop) | | | | aspherical coefficients 1st surface
$K = 0$   $A_4 = 0.15 \times 10^{-3}$   ($A_{2i} = 0$, when $i \geq 3$)
$f = 25.50$   $F = 10.0$   $\beta = 1.68$   $p = 0.0223$
$x/f = 0.136$   $\omega = 39.12$   $TL = 24.89$

13th Example

| Surface No. | r | D | nd | vd |
|---|---|---|---|---|
| 1 | 3.575 | 1.11 | 1.492 | 57 |
| 2 | 3.713 | 0.761 | | |
| 3 | 41.45 | 0.935 | 1.492 | 57 |
| 4 | −34.13 | 0.0727 | | |
| 4 | aperture-stop | | | | aspherical coefficients 1st surface
$K = -0.3445$   $A_4 = 5.0$   $A_6 = 0.24028 \times 10^{-5}$
$A_8 = -0.20714 \times 10^{-10}$   $A_{10} = 0.42796 \times 10^{-15}$
$f = 24.00$   $F = 8.00$   $P = 0.0210$
$x/f = 0.120$   $\omega = 39.28$   $TL = 23.86$
$f_1/f_2 = 0.29$   $(r_4 + r_3)/(r_4 - r_3) = -4.7$ In the following 14th and 15th examples, the image sensing surface is formed as a cylindrical surface which has a radius of curvature R of 80, and is curved in the direction of the long side of the image surface. In the 16th example, the image sensing surface is formed as a cylindrical surface which has a radius of curvature R of 70, and is curved in the direction of the long side.

In the 17th example, the picture plane is formed as a cylindrical surface which has a radius of curvature R of 100, and is curved in the direction of the long side.

In the 17th example, a small sized diaphragm is inserted in the middle of the 4th surface and the aperture-stop in the 14th example, so that the diaphragm is stopped down. In the case where the diaphragm is switched for use, when the diaphragm is stopped down at a position closer to the lens than the position of the initially provided diaphragm, aberrations become desirable at the time of stop-down, and further, brightness of the edges of the image field is not decreased, which is desirable. Of course, when the diameter of the initially provided diaphragm is decreased, the above-described effects can also be obtained.

In this connection, when the upper limit of the relationship (5-2) is negative in the following examples, it may be considered that the upper limit of R is infinity.

14th Example

| Surface No. | r | D | nd | vd |
|---|---|---|---|---|
| 1 | 5.274 | 1.4 | 1.492 | 57 |
| 2 | 6.925 | 1.2 | | |
| 3 | −19.74 | 1.4 | 1.492 | 57 |
| 4 | −13.17 | 1.1 | | |
| 4 | aperture-stop | | | | aspherical coefficients 1st surface
$K = -1.309$   $A_4 = 0.83074 \times 10^{-3}$
$A_6 = 0.60315 \times 10^{-4}$   $A_8 = -0.49992 \times 10^{-5}$
$A_{10} = 0.12685 \times 10^{-6}$
$f = 25.55$   $F = 8.00$   $P = 0.0232$
$x/f = 0.200$   $\omega = 33.5$   $TL = 26.29$
$f_1/f_2 = 0.47$   $(r_4 + r_3)/(r_4 - r_3) = -5.0$

15th Example

| Surface No. | r | D | nd | vd |
|---|---|---|---|---|
| 1 | 5.274 | 1.4 | 1.492 | 57 |
| 2 | 6.925 | 1.2 | | |
| 3 | −19.74 | 1.4 | 1.492 | 57 |
| 4 | −13.17 | 1.4 | | |
| 4 | aperture-stop | 0.7 | | |
| 6 | diaphragm | | | | aspherical coefficients 1st surface
$K = -1.309$   $A_4 = 0.83074 \times 10^{-3}$
$A_6 = 0.60315 \times 10^{-4}$   $A_8 = -0.49992 \times 10^{-5}$
$A_{10} = 0.12685 \times 10^{-6}$
$f = 25.55$   $F = 11.0$   $P = 0.0232$
$x/f = 0.200$   $\omega = 33.5$   $TL = 26.29$
$f_1/f_2 = 0.47$   $(r_4 + r_3)/(r_4 - r_3) = -5.0$

16th Example

| Surface No. | r | D | nd | vd |
|---|---|---|---|---|
| 1 | 5.3 | 1.1 | 1.492 | 57 |
| 2 | 8.549 | 2.0 | | |
| 3 | diaphragm | 0.9 | | |
| 4 | aperture-stop | | | |

$f = 25.50$   $F = 11.0$   $\beta = 1.59$   $P = 0.0236$
$x/f = 0.157$   $\omega = 33.5$   $TL = 24.86$

17th Example

Figure 21:
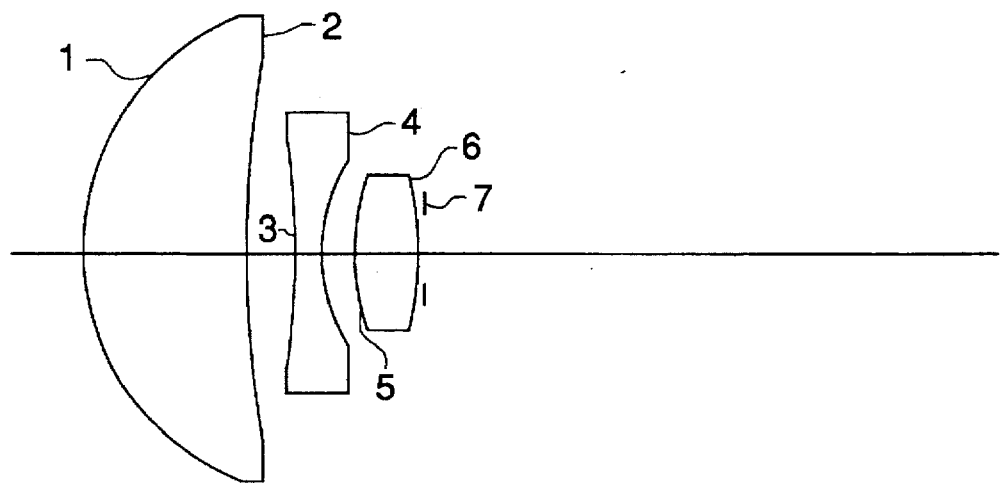
FIG. 21 is a sectional view of the 18th example of the optical system for use in the camera of the present invention.
Figure 22:
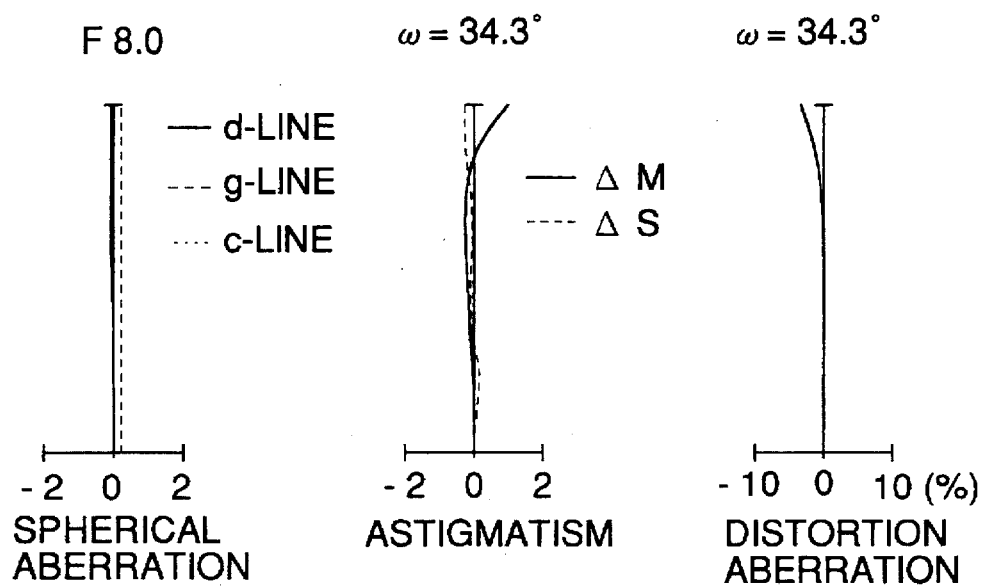
FIG. 22 is a view of aberration of the 18th example of the optical system for use in the camera of the present invention.
Figure 23:
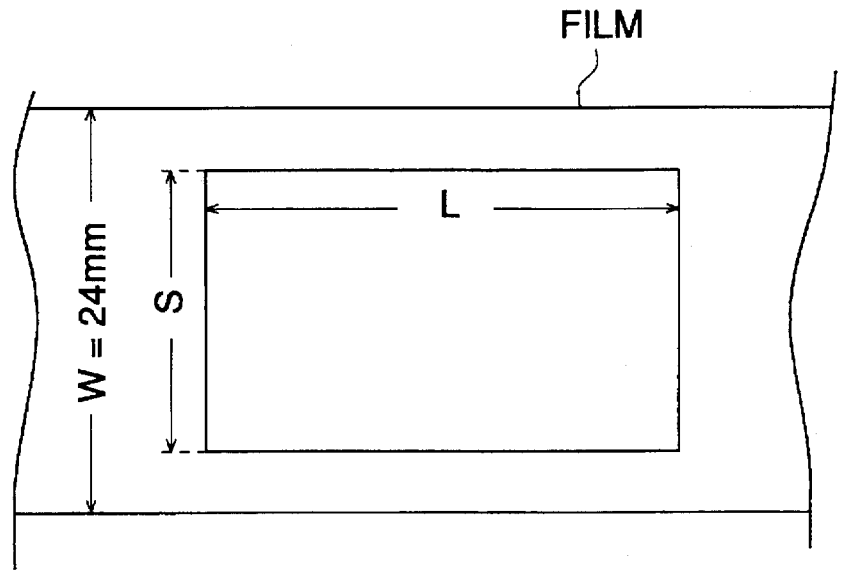
FIG. 23 is an illustration of an image surface of a film for use in the camera of the present invention.
Figure 24:
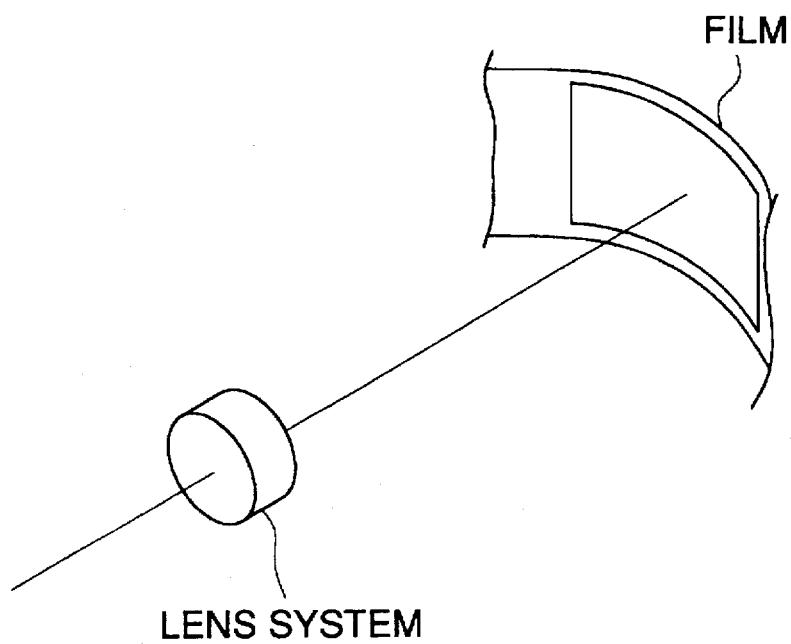
FIG. 24 is an illustration showing the relationship of a lens with the curvature of the film, in the camera of the present invention.

| Surface No. | r | D | nd | vd |
|---|---|---|---|---|
| 1 | 4.058 | 1.10 | 1.492 | 57 |
| 2 | 4.615 | 0.70 | | |
| 3 | −23.669 | 1.40 | 1.492 | 57 |
| 4 | −13.034 | 0.10 | | |
| 5 | aperture-stop | | | | aspherical coefficients 1st surface
$K = -0.91611$   $A_4 = 0.12388 \times 10^{-2}$
$A_6 = 0.20650 \times 10^{-3}$   $A_8 = -0.32347 \times 10^{-4}$
$A_{10} = 0.16043 \times 10^{-5}$
$f = 25.57$   $F = 10.5$   $P = 0.0211$
$x/f = 0.13$   $\omega = 34.68$   $TL = 25.92$
$f_1/f_2 = 0.73$   $(r_4 + r_3)/(r_4 - r_3) = -3.45$ In the 18th example, the lens system of the camera of the present invention is composed of 3 lens elements as shown in FIG. 21, and each element has respectively positive, negative, and positive power of refraction from the object side. Due to this composition, the Petzval's sum can be reduced, and thereby, curvature of the field is smaller. Therefore, the amount of curvature of the image sensing surface can be reduced, or the image sensing surface canbe flat. Further, the thickness of the camera main body can be reduced.

Further, in the 18th example, when 3 lens elements are made of plastic, the manufacturing cost can be lowered, which is most appropriate for low cost cameras such as one-way-use cameras. Specifically, when the largest sized lens, provided closest to the object, is made of plastic, the weight of the camera can be effectively reduced.

In the 18th example, at least one surface of the positive meniscus lens, being convex to the object side, is aspherical. When the focal length of this lens is $f_1$, the focal length of the overall system is f, the ratio of refraction of the positive lens is $n_p$, and the ratio of the refraction of the negative lens is $n_m$, the lens system is structured so that the following relationship is satisfied, $$1.4 < f/f_1 < 1.6 \quad \text{(i)}$$

$$1.45 < n_p < 1.55 \quad \text{(ii)}$$

$$1.53 < n_m < 1.65 \quad \text{(iii)}$$

In these relationship, in the case where the lens is made of the material satisfying the relationship (ii) and (iii), the curvature of the field can be reduced when $f_1$ is determined to satisfy the relationship (i). When the upper limit of the relationship (i) is exceeded, the aperture efficiency is lowered, and the brightness of the edges of the image field is lowered, which is not desirable. When the lower limit of the relationship (i) is exceeded towards the lower side, the Petzval's sum is larger, and the curvature of the field is larger, which also is not desirable. Further, when at least one surface of the above-described lens, closest to the object side, is aspherical, (specially, when the aspherical surface is formed so that the power of refraction is smaller as the distance from the optical axis becomes larger), the coma and meridional image surface can be compensated for at the edges of the image field, which is desirable.

Further, in the case where the lens is made of the material satisfying the relationships (ii) and (iii), and the image sensing surface is curved towards the lens side, the chromatic aberration and spherical aberration can be desirably compensated for when the following relationship (iv) is satisfiedby $f_1$, $$1.2 < f/f_1 < 1.4 \quad \text{(iv)}$$

In this case, when the upper limit of the relationship (iv) is exceeded, the spherical aberration is larger, and the aperture efficiency is slightly lowered, which is not desirable. When the lower limit of the relationship (iv) is exceeded towards the lower side, the curvature of the field is too large, which is undesirable. Especially, since the distortion aberration is small under the condition that the lower limit is exceeded towards the lower side, when the amount of displacement due to the curvature of the image sensing surface is larger, the barrel form distortion generated along the long side of the image surface becomes remarkable, which is undesirable.

18th Example

| Surface No. | r | D | nd | v |
|---|---|---|---|---|
| 1 | 6.924 | 4.80 | 1.49200 | 57.0 |
| 2 | 41.951 | 1.40 | | |
| 3 | −34.839 | 0.91 | 1.58300 | 30.0 |
| 4 | 4.901 | 1.00 | | |
| 5 | 7.659 | 1.80 | 1.49200 | 57.0 |
| 6 | −14.422 | | | |
| 7 | aperture-stop | | | | aspherical coefficients 1st surface
$K = -0.265375$
$A_4 = 0.138363 \times 10^{-4}$
$A_6 = 0.134404 \times 10^{-5}$
$A_8 = -0.846045 \times 10^{-8}$
aspherical coefficients 3rd surface
$K = -23.3716$
$A_4 = -0.415426 \times 10^{-3}$
$A_6 = 0.254099 \times 10^{-4}$
$A_8 = -0.572069 \times 10^{-6}$
aspherical coefficients 5th surface
$K = -9.96968$
$A_4 = 0.361975 \times 10^{-2}$
$A_6 = -0.953691 \times 10^{-4}$
$A_8 = -0.807929 \times 10^{-5}$
aspherical coefficients 6th surface
$K = -0.644420 \times 10^{-2}$
$A_4 = -0.693889 \times 10^{-3}$
$A_6 = 0.986590 \times 10^{-3}$
$A_8 = -0.288852 \times 10^{-3}$
$f = 25.59 \qquad \omega = 34.3° \qquad F = 8.0$ As can be seen in each example, the camera of the present invention has a lens, the overall length of which is very short, and which has an appropriate F-number, and thereby the depth of field is very great. Further, as can be seen from the aberration curves in each example, the film has an appropriate film aspect ratio and an appropriate curvature of the film surface, and thereby the very excellent image quality can be obtained from the closest distance to infinity over the wide angle of view. Accordingly, a camera system, which is very compact and meets user's needs, can be obtained.

What is claimed is:

1. A camera for forming an image of an object on a rolled film at a picture plane located at a predetermined position in said camera, said film having a width of 24 mm, said camera comprising:

a photographing lens wherein a convex surface thereof faces said object and satisfies:

$$18 \leq f \leq 32 \text{ and}$$

$$f^2/90 \leq F \leq 16$$

wherein f is the focal length of said photographing lens and F is the F number of said photographing lens;

at least one diaphragm; and wherein said picture plane has a picture frame satisfying:

$$23 \leq L \leq 32 \text{ and}$$

$$1.5 \leq L/S \leq 6.5$$

wherein L (mm) is the long dimension of said picture frame, S (mm) is the short dimension of said picture frame, and said image of said object is formed on said picture plane through said photographing lens and said at least one diaphragm.

2. The camera of claim 1, wherein photographing lens further satisfies:

$20 \leq f \leq 28$.

3. The camera of claim 1, wherein photographing lens further satisfies:

$22 \leq f \leq 26$.

4. The camera of claim 2, wherein said photographing lens is composed of a single positive meniscus lens and both sides of said picture plane in a longitudinal direction are curved toward said photographing lens.

5. The camera of claim 4, further satisfying:

$1.5 \leq \beta \leq 1.8$ and $\frac{1}{2}(0.8 \text{ h max.})^2 (P-F/550) \leq \Delta(0.8 \text{ h max.}) \leq 1.5$ wherein $\beta$ is defined by $(1-1/n)f/r_1$, $\Delta(h)$ is the displacement amount from a plane, perpendicular to an optical axis of said photographing lens, which crosses an intersection of said picture plane and said optical axis and is positioned at a distance h from said optical axis in said longitudinal direction on said picture plane, P is the Petzval's sum of said photographing lens, F is the F-number of said photographing lens, and h max. is the maximum distance in said longitudinal direction on said picture plane from said optical axis.

6. The camera of claim 4, further satisfying:

$48 \leq R \leq (P-F/550)^{-1}$ wherein R (mm) is the radius of curvature of a cylindrical surface as said picture plane, and P is the Petzval's sum of said photographing lens.

7. The camera of claim 4, further satisfying:

$0.12 \leq X/f \leq 0.18$ wherein X (mm) is the distance from a surface of said photographing lens, being closest to said object, to one of said at least one diaphragm, being closest to said object, and f is the focal length of said photographing lens.

8. The camera of claim 7, wherein said at least one diaphragm includes an aperture-stop and a diaphragm for limiting a luminous flux outside said optical axis.

9. The camera of claim 2, wherein said photographing lens is composed of a positive meniscus lens, having said convex surface on a closest side toward said object, and a positive lens, being closer to said picture plane than said positive meniscus lens, and both sides of said picture plane in a longitudinal direction are curved toward said photographing lens.

10. The camera of claim 9, further satisfying:

$1.5 \leq \beta \leq 1.8$ and $\frac{1}{2}(0.8 \text{ h max.})^2 (P-F/550) \leq \Delta(0.8 \text{ h max.}) \leq 1.5$ wherein $\beta$ is defined by $(1-1/n) f/r_1$, $\Delta(h)$ is the displacement amount from a plane, perpendicular to an optical axis of said photographing lens, which crosses an intersection of said picture plane and said optical axis and is positioned at a distance h from said optical axis in said longitudinal direction on said picture plane, P is the Petzval's sum of said photographing lens, F is the F-number of said photographing lens, and h max. is the maximum distance in said longitudinal direction on said picture plane from said optical axis.

11. The camera of claim 9, further satisfying:

$48 \leq R \leq (P-F/450)^{-1}$ wherein R (mm) is the radius of curvature of a cylindrical surface as said picture plane, and P is the Petzval's sum of said photographing lens.

12. The camera of claim 9, further satisfying:

$0.1 \leq X/f \leq 0.23$ wherein X (mm) is the distance from a surface of said photographing lens, being closest to said object, to one of said at least one diaphragm, being closest to said object, and f is the focal length of said photographing lens.

13. The camera of claim 9, wherein said at least one diaphragm includes an aperture-stop and a diaphragm for limiting a luminous flux outside said optical axis.

14. The camera of claim 1, wherein said photographing lens is composed of a positive meniscus lens, having said convex surface faced toward said object, a negative lens, having a concave surface faced toward said picture plane, and a biconvex lens in a sequential order from a side of said object to a side of said picture plane.

15. The camera of claim 14, wherein all of said positive meniscus lens, said negative lens, and said biconvex lens are made of plastics.

16. The camera of claim 14, wherein at least one surface of said positive meniscus lens is an aspherical surface, and said camera satisfies:

$1.4 < f/f_1 < 1.6$ $1.45 < n_p < 1.55$ and $1.53 < n_m < 1.65$ wherein $f_1$ is the focal length of said positive meniscus lens, f is the system focal length of said photographing lens, $n_p$ is the index of refraction of said positive meniscus lens, and $n_m$ is the index of refraction of said negative lens.

17. The camera of claim 16, wherein both sides of said picture plane in a longitudinal direction are curved toward said photographing lens, at least one surface of said positive meniscus lens is an aspherical surface, and said camera satisfies:

$1.2 < f/f_1 < 1.4$ $1.45 < n_p < 1.55$ and $1.53 < n_m < 1.65$ wherein $f_1$ is the focal length of said positive meniscus lens, f is the system focal length of said photographing lens, $n_p$ is the index of refraction of said positive meniscus lens, and $n_m$ is the index of refraction of said negative lens.

* * * * *